United States Patent [19]
Roye

[11] 3,854,030
[45] Dec. 10, 1974

[54] DIFFUSION BOND RIVETING SYSTEM
[75] Inventor: Cleveland E. Roye, Spring Valley, Calif.
[73] Assignee: General Dynamics Corporation, San Diego, Calif.
[22] Filed: Sept. 27, 1973
[21] Appl. No.: 401,526

[52] U.S. Cl. .................. 219/150, 219/72, 219/86
[51] Int. Cl. ........ B21j 5/08, H05b 1/00, B23k 9/16
[58] Field of Search ............ 219/72, 78, 85, 91, 86; 228/3, 6, 42

[56] References Cited
UNITED STATES PATENTS
2,781,442  2/1957  Flessner et al. ................ 219/78 X
3,193,657  7/1965  Gebauer ........................ 219/72 X
3,678,241  7/1972  Erlandson et al. .............. 219/72 X FOREIGN PATENTS OR APPLICATIONS
65,888  7/1914  Austria ............................ 219/72

Primary Examiner—Bruce A. Reynolds
Assistant Examiner—Kenneth Hairston
Attorney, Agent, or Firm—John R. Duncan; Hugo F. Mohrlock

[57] ABSTRACT

A riveting system in which rivets are diffusion bonded to the material being riveted is disclosed. A rivet, preferably having a substantially oxide-free surface, is placed in a hole also preferably having a substantially oxide-free surface. The volume around the rivet and hole is preferably enclosed in an inert atmosphere. The rivet and the adjacent surface are heated to diffusion bonding temperatures and the ends of the rivet are squeezed together so that the rivet shank expands into diffusion bonding contact with the hole wall. Simultaneously, the ends of the rivet may be formed into rivet heads and diffusion bonded to the outer surfaces adjacent to the hole. This system is especially suitable for use with high-strength, high-temperature-resistant metals such as titanium and other refractory metals.

6 Claims, 4 Drawing Figures

PATENTED DEC 10 1974 3,854,030

DIFFUSION BOND RIVETING SYSTEM

BACKGROUND OF THE INVENTION

Structural riveting has long been used in the aircraft and aerospace industries because of the numerous advantages of rivets over other fastening techniques, such as bolts, welding, etc. Typically, metal sheets are riveted to stringers to form the outer enclosure or skin of aircraft. Rivets may be quickly, accurately and inexpensively placed in desired locations and in numbers sufficient to give any desired strength characteristics. Rivets have generally greater strength and greater reliability in a direction parallel to the rivet shank than does spot welding or similar processes.

Conventional riveting has been very effective with aluminum and steel structures. However, recently there has been increasing interest in forming the outer surface of aerospace vehicles from titanium or other refractory metals. For the purposes of this application "refractory metal" will be understood to include high-strength, high-temperature-resistant metals including titanium, rhenium, tantalum, vanadium, molybdenum, tungsten, columbium, and other metals and alloys having similar characteristics. These materials have much higher strength at high temperatures and so are highly desirable for use where high surface temperatures are likely, such as in spacecraft atmospheric re-entry or in very high speed aircraft.

While these materials have a number of highly desirable characteristics, other physical characteristics limit the use of conventional riveting techniques with them. Rivet holes in these materials act as stress risers and encourage cracking or tearing in the riveted sheets when riveted in a conventional manner. Similarly, problems occur when these materials are secured by spot welding. Since the melting temperatures of these metals are so high, it is difficult to rapidly and reliably heat the weld areas to welding temperatures. Also, localized melting during welding is likely to locally change the physical characteristics of a sheet material. Attempts have been made to combine rivet and welding techniques by heating the rivet and adjacent material above their melting temperature, such as is described in Bennett's U.S. Pat. No. 3,524,042. While this method is useful with metals such as copper or aluminum, it is generally not suitable for use with refractory metals due to the high temperatures required and the loss of strength in the heated areas. Welding often results in a localized "cast" structure with lower shear strength and lower fatigue resistance. Heat treated materials may lose desirable properties. The metal in the weld area may become contaminated and subject to localized oxidation or hydrogen embrittlement.

Thus, there is a continuing need for improved methods of fastening metal structures together.

SUMMARY OF THE INVENTION

It is an object of this invention to provide a method of riveting refractory and similar metals such as titanium which overcomes the above-noted problems.

Another object of this invention is to provide a rivet system of improved strength and reliability.

Still another object of this invention is to provide a rivet system in which a metallurgical bond is formed between rivet and hole walls without significant adverse effects on the physical characteristics of the structure.

The above objects, and others, are basically accomplished in accordance with this invention by a method and apparatus in which preferably substantially oxide-free rivet and hole surfaces are brought into juxtaposition, the rivet and adjacent surfaces are heated to diffusion bonding temperatures and the rivet is pressed so that the rivet shank is brought into diffusion bonding contact with the adjacent hole surfaces. The rivet heads may then be hot forged to the desired shape and diffusion bonded to the structure as desired. Preferably, oxygen is substantially excluded from the volume around the rivet and hole during the diffusion bond riveting operation.

BRIEF DESCRIPTION OF THE DRAWING

Details of the invention will be further understood upon reference to the drawing, wherein.

DETAILS OF THE INVENTION

Figure 1:
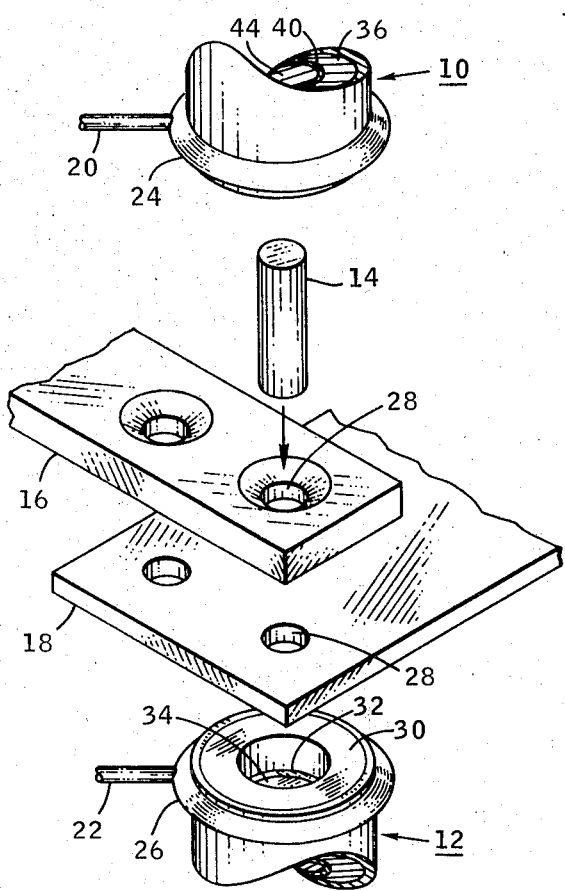
FIG. 1 is a schematic perspective view showing the portion of the riveting means adjacent the joint to be riveted.

As schematically illustrated in FIG. 1, the diffusion riveting system includes an upper head 10 and a lower head 12 between which a rivet 14 is squeezed and diffusion bonded to secure metal sheets 16 and 18 together. Heads 10 and 12 may be mounted in any suitable means to provide the desired movement, such as conventional large C-shaped riveting head supports. An inert gas, such as argon is piped from a conventional tank or other source (not shown) through tubes 20 and 22 to manifolds 24 and 26 mounted on metal jackets 25 and 27, respectively. From manifolds 24 and 26 the inert gas is passed to the space around rivet 14 during diffusion riveting, as detailed below.

When riveting most refractory metals, it is generally preferred that oxygen be excluded from the volume around the rivet and hole during diffusion bond riveting, since a thick oxide film at the bond interface may interfer with the diffusion bond. Generally, this area may be subjected to a vacuum or an inert gas may be flowed through the area. The exclusion of oxygen, however, may not be necessary with some metals, such as gold, which either oxidize very slowly, or with which an oxide film does not seriously adversely affect the diffusion bond.

The several concentric means making up heads 10 and 12 are movable toward sheets 16 and 18 in the desired sequence by conventional means (not shown) which may, for example, be pneumatic or hydraulic.

Figure 2:
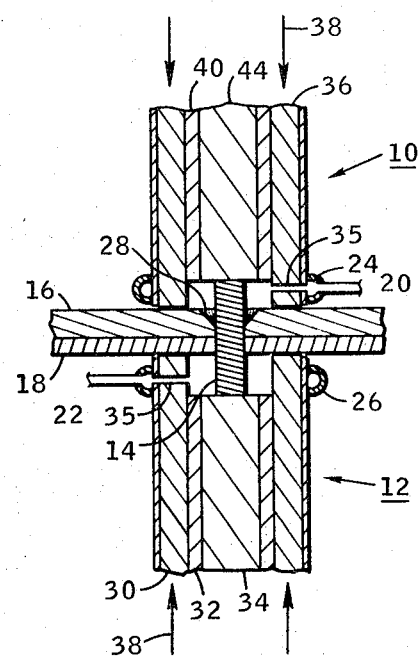
FIG. 2 is a schematic vertical section through the riveting means in the sheet clamping position.
Figure 3:
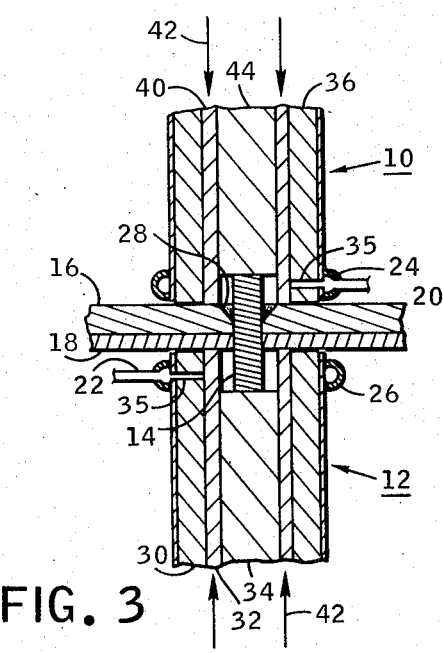
FIG. 3 is a schematic vertical section through the riveting means in a hole area heating position.
Figure 4:
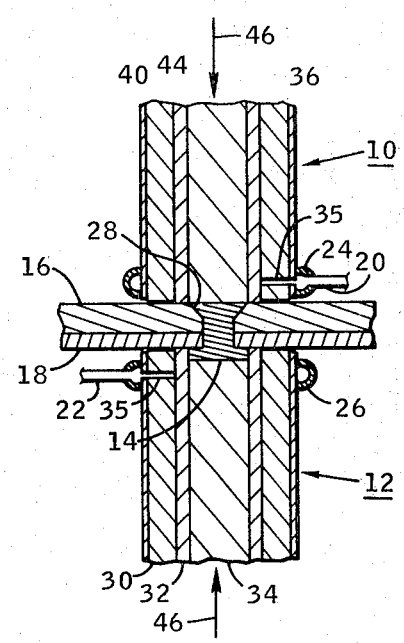
FIG. 4 is a schematic vertical section through the riveting means in the final rivet forging position.

Details of heads 10 and 12 and of the diffusion riveting process will be further understood upon reference to FIGS. 2, 3 and 4.

Lower head 12 is brought up under aligned hole 28 in sheets 16 and 18 with ring-shaped lower ceramic pressure foot 30 in contact with the lower surface of sheet 18 and tubular lower heater 32 and lower anvil 34 spaced from sheet 18. Rivet 14 is inserted in hole 28 and upper head 10 is brought into contact with upper sheet 16.

The walls of hole 28 should preferably be clean and substantially free of surface oxides. Typically, hole 28 can be treated with a reducing agent just before riveting. Or, hole 28 can be kept oxide-free by drilling and countersinking the hole in an inert atmosphere and maintaining an inert atmosphere within removable covers over hole 28 until ready for riveting. Similarly, rivet 14 should be clean and substantially free of surface oxides. Typically, rivets can be chemically deoxidized and kept in an inert atmosphere until ready for use. A short exposure to air at ordinary temperatures while inserting the rivet and bringing the rivet means into position will not have a significant adverse effect on the quality of the diffusion bond obtained. With some metals, such as gold, either a thick oxide film does not easily develop, and/or the oxide film does not interfer with the diffusion bond. With these metals, removal of surface oxides may not always be necessary.

Inert gas is introduced into manifolds 24 and 26 through tubes 20 and 22 (as shown in FIG. 1) and passes to the space around rivet 14 through a plurality of holes 35. Air surrounding rivet 44 is flushed out through the slight gap between lower pressure foot 30 and sheet 18 and between upper ceramic pressure foot 36 and sheet 16. Then, pressure feet 30 and 36 are squeezed together as indicated by arrows 37 to hold sheets 16 and 18 in place.

As seen in FIG. 3, tubular lower heater 32 and tubular upper heater 40 are moved together as indicated by arrows 42 and into contact with sheets 16 and 18. Resistance heating elements in heaters 32 and 40 heat the area of sheets 16 and 18 around hole 28 to the diffusion bonding temperature, which in the case of titanium sheets is about 1,750°F. At the same time, resistance heaters in upper anvil 44 and lower anvil 34 heat rivet 28 to the diffusion bonding temperature.

While in most applications resistance heating is preferred, any other suitable heating method may be used. Typical heating methods include resistance, induction, conduction, radiation and any combination thereof. Of these, resistance heating (with inherent secondary conduction) is preferred because of the ease with which rapid, uniform heating can be accomplished.

Finally, as shown in FIG. 4, anvils 34 and 44 are moved toward each other as indicated by arrows 46 to deform rivet 14 into the desired shape and simultaneously diffusion bond it to sheets 16 and 18. Heads 10 and 12 are then separated and sheets 16 and 18 are removed.

While the illustrated rivet is formed into a flush, countersunk upper end and a headed lower end, the upper and lower anvils 34 and 44 can be changed for other head styles, using any suitable rivet. For example, either end of the rivet may be prefabricated or fabricated during the diffusion bond riveting operation. Typical rivet configurations include countersunk, brazier head, headless, etc. Diffusion bonded rivets are self-sealing, so that no sealing compound is needed where pressurized vessels, such as aircraft fuselages or fuel tanks are being riveted.

The following examples present details of preferred embodiments of the process of this invention.

EXAMPLE I

A pair of Ti-6Al-4V titanium sheets, available from G. O. Carlson, Inc., each about 0.125 inch thick, are sandwiched together. A hole having a diameter of about 0.252 inch is drilled through the sandwich and the upper surface is countersunk. A cylindrical Ti-6Al-4V titanium rivet slug, having a diameter of about 0.250 inch and a length of about 0.650 inch, is degreased by cleaning with trichlorethylene, then chemically picked in a solution of $HNO_3$, HF and de-ionized water. The hole walls are similarly degreased and chemically pickled and the rivet is placed in the hole with a lower riveting head positioned as shown at 12 in FIG. 2 of the drawing. An upper riveting head is then positioned as shown at 10 in FIG. 2. Argon gas is then introduced into the manifolds to flush air from the space around the rivet and the upper and lower pressure feet are squeezed together to hold the titanium sheets in position. Upper and lower ring heaters are moved into position against the sheets as shown in FIG. 3 and the sheet area around the hole and the rivet are heated by resistance heaters within the ring heaters and anvils to a temperature of about 1,750°F. The upper and lower anvils are then squeezed together at a pressure of about 2,500 psi to deform the upper portion of the rivet into the countersunk area and to form a head from the lower portion of the rivet. The two riveting heads are then removed. Metallurgical examination shows the rivet to be uniformly diffusion bonded to the sheets without significant change in the physical properties of the sheets in the area near the rivet.

EXAMPLE II

A 0.5% titanium-molybdenum alloy sheet, available from Fansteel Company, about 0.050 inch thick is placed over a TD-Ni-Cr U-channel having a wall thickness of about 0.063 inch. In an inert gas atmosphere a hole having a diameter of about 0.158 inch is drilled through the sandwich and the hole is countersunk at the lower end. A headed, generally cylindrical, 0.5% titanium-molybdenum alloy 0.250 inch long rivet is degreased by cleaning with trichlorethylene and an acid pickling bath, then is immediately inserted in the hole with the head on the non-countersunk side. Upper and lower riveting heads are brought into contact with the rivet and area adjacent to the hole, as shown in FIG. 2 of the drawing. The space around the rivet is flushed with helium and the pressure feet are pressed together to hold the sheet and channel in position. Upper and lower ring heaters are then brought into pressing contact with the area around the rivet and upper and lower anvils are brought into contact with the ends of the rivet. Resistance heaters in the anvils and ring heaters are activated and the rivet and adjacent hole wall areas are heated to about 2,600°F. Upper and lower anvils are then moved together to expand the rivet into intimate contact with the hole walls and to deform the cylindrical rivet end into the countersunk space to form a flush surface. The riveting heads are then removed and the rivet area is allowed to cool. Metallurgical examination of the rivet shows uniform diffusion bonding between the rivet and the hole walls and excellent strength characteristics without significant changes in the characteristics of the sheet and channel near the rivet.

EXAMPLE III

A Ti-5Al-2.5Sn sheet, available from Continental Metals, about 0.032 inch thick is placed over a 0.050 inch thick Ti-6Al-4V doubler sheet. Several holes having a diameter of about 0.158 inch are drilled through the sandwiched sheets at specified locations. The 0.050 inch thick sheet is countersunk on the lower surface. A cylindrical Ti-6Al-4V titanium rivet slug having a manufactured round head on one end, with a diameter of about 0.155 inch and a length of about 0.200 inch is degreased by cleaning with trichlorethylene then chemically pickled in a solution of HF, $HNO_3$ and de-ionized water. The sandwiched sheets are similarly prepared and the rivet slugs are placed in the holes with riveting heads positioned at the top. With the rivet set in position between the upper and lower electrodes heat (current) and pressure are supplied by the electrodes to the rivet slug upsetting one end of the rivet slug and swelling the rivet into the sandwiched panel holes sufficiently to cause diffusion bonding between rivet slug shank and panel hole walls. The manufactured round heads are also diffusion bonded to the sandwiched panel surfaces. The rivet slugs are resistance heated to a temperature of about 1,800°F. The pressure is applied above the hot compressive yield point of the Ti-6Al-4V rivet slug when the rivet is at the diffusion bonding temperature. The two electrode heads are then removed. Metallurgical examination shows the rivet slug to be uniformly diffusion bonded to the sheets without significant change in the physical properties of the sheets in the area near the rivet.

EXAMPLE IV

Three Ti-6Al-4V titanium sheets, available from G. O. Carlson, Inc., having thicknesses of 0.040, 0.063 and 0.080 inch are sandwiched together. Several holes having a diameter of about 0.191 inch are drilled through the sandwich and the two outer surfaces are countersunk. A cylindrical Ti-6Al-4V titanium rivet slug having a diameter of about 0.189 inch and a length of 0.350 inch is degreased by cleaning with trichlorethylene then chemically pickled in a solution of $HNO_3$, HF and de-ionized water. The hole walls are similarly degreased and chemically pickled and the rivet is placed in the hole with the lower and upper electrodes positioned adjacent to the rivet ends. Argon gas is flushed into the joint areas forcing out the air and preventing oxidation during the heat cycle. The electrodes provide resistance heating to the rivet slug which then conducts heat to the panel walls. The rivet is heated to about 1,750°F and pressed at about 2,500 psi. Application of heat and stress above the compressive yield point caused rivet deformation, resulting in intimate contact of the parts to be joined, rupture of surface barriers, and metal flow to accomplish diffusion bonding. The two riveting electrodes are then removed. Metallurgical examination shows the rivet slug and panel to be uniformly diffusion bonded to the sheets without significant change in the physical properties of the sheets in the area near the rivet slug.

EXAMPLE V

A pair of 2219 aluminum alloy sheets, available from Alcoa, each about 0.125 inch thick, are sandwiched together on opposite sides of a Ti-6Al-4V sheet, which is 0.375 inch thick (FIG. 1). A hole having a diameter of about 0.378 inch is drilled through the sandwich. A cylindrical Ti-5Al-2.5Sn titanium rivet slug having a diameter of about 0.375 inch and a length of about 1.00 inch is degreased by cleaning with trichlorethylene, then chemically pickled in a solution of $HNO_3$, HF and de-ionized water. The hole walls are prepared by mechanical cleaning (scrapping) and the rivet is placed in the hole with the electrodes positioned adjacent to the rivet ends. The rivet slug is resistance heated in air between 500° to 600°F, then swelled into the sandwiched panel, forming two circular rivet heads simultaneously as shown in FIG. 3. The two riveting electrodes are then removed. Metallurgical examination shows the rivet to be uniformly diffusion bonded to the sheets without significant change in the physical properties of the sheets in the area near the rivet.

EXAMPLE VI

A pair of elemental beryllium sheets having thicknesses of about 0.2 inch are sandwiched and a 0.15 inch diameter hole is drilled therethrough. A cylindrical beryllium rivet pin having a length of about 0.25 inch and a diameter of about 0.15 inch is inserted in the hole after both the pin and the hole walls are cleaned and deoxidized with a chemical reducing agent. Two electrode heads of the sort shown in the drawing are brought into position adjacent each end of the rivet and the area around the rivet and hole is flushed with argon. Resistance heaters in the heads then heat the rivet and adjacent sheet area to about 1,200°F. The head anvils are then pressed together to a total pressure of about 2,000 psi to deform the rivet to form upper and lower heads and bring the rivet into intimate contact with the hole wall. The riveting heads are removed and the area is allowed to cool to room temperature. An excellent diffusion bond is found to have occurred.

EXAMPLE VII

A niobium sheet having a thickness of about 0.25 inch is sandwiched together with a 0.25 inch Ti-6Al-4V sheet and a 0.25 inch hole is drilled therethrough. A cylindrical niobium rivet pin having a length of about 0.7 inch and a diameter of about 0.25 inch is fitted into the hole after both the rivet and hole walls are chemically cleaned and deoxidized. Rivet heads of the sort shown in the drawing are brought into position and helium is circulated around the hole area. The rivet and adjacent sheet areas are heated to about 1,800°F, then the anvils are pressed together at a pressure of about 2,800 psi. The rivet heads are deformed into contact with the sheets and the rivet is expanded into tight contact with the hole walls. The riveting heads are then removed and the area is allowed to cool to room temperature. An excellent diffusion bond is found to have formed between the rivet and the two sheets.

Although certain preferred proportions and materials have been specified in the above description of a preferred embodiment and examples, these may be varied or modified, as mentioned above. Further modifications, applications and ramifications of this invention will occur to those skilled in the art upon reading this disclosure. These are intended to be included within the scope of the invention as defined in the appended claims.

I claim:
1. A diffusion riveting device which comprises:
Means to support a rivet in a hole through a material to be riveted;
enclosing means surrounding said rivet and hole;
means to maintain an inert atmosphere within said enclosing means;

first heating means adapted to be positioned in contact with a rivet supported in said hole to heat said rivet to a diffusion bonding temperature;

second heating means adapted to be positioned in contact with material adjacent to said hole and spaced from a rivet supported in said hole to heat said material adjacent to said hole to a diffusion bonding temperature; and pressure means to squeeze the end of said rivet toward each other to expand the body of said rivet into diffusion bonding contact with the wall of said hole and to reshape the ends of said rivets into the desired rivet head shape.

2. The diffusion riveting device according to claim 1 wherein said enclosing means comprises a pair of generally tubular metal-cased ceramic members adapted to contact opposite sides of said material around said hole and including means to apply clamping pressure to said material through said ceramic members.

3. The diffusion riveting device according to claim 1 wherein said means to maintain an inert atmosphere includes a ring-like manifold means around each enclosing means, means to admit an inert gas to said manifold from an inert gas source, and a plurality of orifices between said manifolds and the interior of said enclosing means.

4. The diffusion riveting device according to claim 1 where said second heating means includes a pair of generally ring-shaped heating means positioned within said enclosing means, and means to move said ring-shaped heating means into and out of contact with each surface of said meterial adjacent to said hole, and said first heating means is located within a pair of anvils, and said device includes means to move said anvils into and out of pressure contact with the ends of said rivets.

5. The diffusion riveting device according to claim 4 wherein said ring-shaped heating means and said anvils include resistance heating elements embedded therein.

6. The diffusion riveting device according to claim 4 wherein said pressure means includes said anvils and means to move them toward each other to deform said rivet.

* * * * *